(12) United States Patent
Andersen

(10) Patent No.: US 12,038,668 B2
(45) Date of Patent: Jul. 16, 2024

(54) LIGHT SOURCE

(71) Applicant: NKT PHOTONICS A/S, Birkerød (DK)

(72) Inventor: Thomas Vestergaard Andersen, Birkerød (DK)

(73) Assignee: NKT PHOTONICS A/S, Birkerød (DK)

(*) Notice: Subject to any disclaimer, the term of this patent is extended or adjusted under 35 U.S.C. 154(b) by 0 days.

(21) Appl. No.: 17/786,775

(22) PCT Filed: Dec. 21, 2020

(86) PCT No.: PCT/DK2020/050404
§ 371 (c)(1),
(2) Date: Jun. 17, 2022

(87) PCT Pub. No.: WO2021/121531
PCT Pub. Date: Jun. 24, 2021

(65) Prior Publication Data
US 2023/0033071 A1 Feb. 2, 2023

(30) Foreign Application Priority Data
Dec. 19, 2019 (DK) .............................. PA201970802

(51) Int. Cl.
*G02F 1/35* (2006.01)
*G02F 1/365* (2006.01)
*H01S 3/00* (2006.01)

(52) U.S. Cl.
CPC ............ *G02F 1/3528* (2021.01); *G02F 1/365* (2013.01); *H01S 3/0085* (2013.01);
(Continued)

(58) Field of Classification Search
CPC .... G02F 1/3528; G02F 1/365; G02F 2201/20; G02F 2201/205; H01S 3/0085; H01S 3/0092
See application file for complete search history.

(56) References Cited

U.S. PATENT DOCUMENTS 7,982,943 B2 * 7/2011 Okuno .................. G02F 1/3513
359/341.1
8,902,495 B2 * 12/2014 Clowes ............... H01S 3/06758
359/341.32

(Continued)

FOREIGN PATENT DOCUMENTS

| EP | 1925975 A1 | 5/2008 |
| EP | 2953215 A1 | 12/2015 |

(Continued)

OTHER PUBLICATIONS

International Preliminary Report on Patentability (Form PCT/IB/373), Notification Concerning Transmittal of International Preliminary Report on Patentability(Form PCT/IB/326) and the Written Opinion of the International Searching Authority (Form PCT/IB/373) dated Jun. 30, 2022, by the International Bureau of WIPO, in corresponding International Application No. PCT/DK2020/050404. (8 pages).

(Continued)

*Primary Examiner* — Daniel Petkovsek
(74) *Attorney, Agent, or Firm* — Boone IP Law

(57) ABSTRACT

A light source, including: a pulse generator for providing an initial sequence of light pulses, the pulse generator including an optical source for producing optical pulses; and a modulator in communication with the optical source for increasing or decreasing the selected number of pulses provided by the pulse generator in the selected time period; first and second optical arms, for propagating, respectively, first and second sequences of light pulses, wherein the first optical (Continued)

Figure 1:
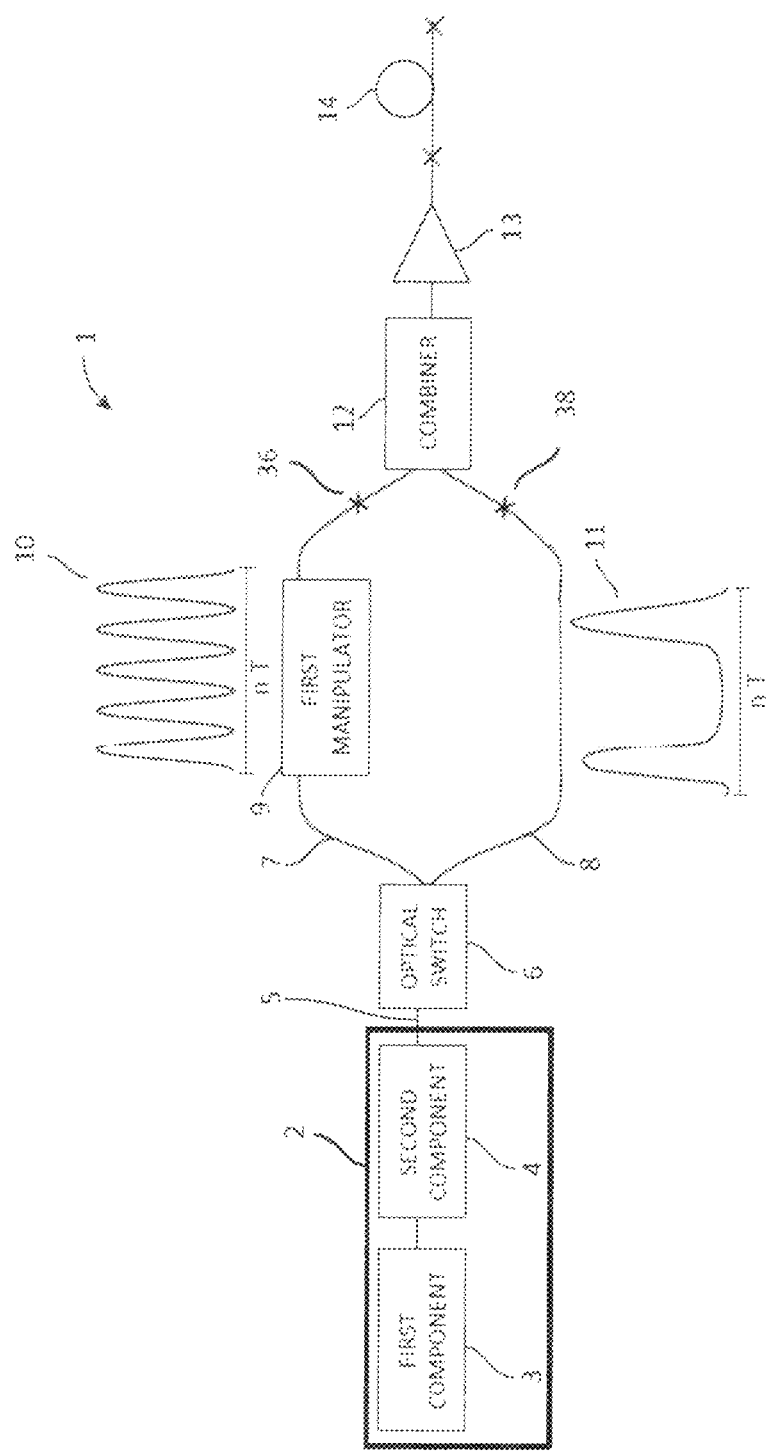

arm includes a first manipulator configured to generate the first sequence of light pulses from the initial sequence of light pulses, wherein the light source includes a nonlinear optical element arranged to receive the first sequence of light pulses or the second sequence of light pulses, and an optical switch arranged to switch either the first sequence of light pulses or the second sequence of light pulses for reception by the nonlinear optical element.

19 Claims, 4 Drawing Sheets

(52) U.S. Cl.
CPC ........ *H01S 3/0092* (2013.01); *G02F 2201/20* (2013.01); *G02F 2201/205* (2013.01)

(56) References Cited

U.S. PATENT DOCUMENTS

| | | |
|---|---|---|
| 2005/0226576 A1 | 10/2005 | Feder et al. |
| 2009/0095890 A1 | 4/2009 | Tanaka |
| 2009/0097512 A1 | 4/2009 | Clowes et al. |
| 2011/0062127 A1 | 3/2011 | Gu et al. |
| 2011/0116282 A1 | 5/2011 | Okuno |
| 2013/0177031 A1 | 7/2013 | Almeida et al. |
| 2014/0204456 A1 | 7/2014 | Chavez-pirson et al. |
| 2015/0192732 A1 | 7/2015 | Moselund |
| 2017/0131556 A1 | 5/2017 | Salama et al. |
| 2018/0217323 A1 | 8/2018 | Lyngsø~e et al. |
| 2019/0103721 A1 | 4/2019 | Ni |
| 2019/0267767 A1 | 8/2019 | Krausz et al. |
| 2022/0149579 A1 | 5/2022 | Yusim et al. |
| 2022/0247143 A1 | 8/2022 | Abdolvand |
| 2022/0337017 A1 | 10/2022 | Michailovas et al. |
| 2023/0023430 A1* | 1/2023 | Andersen .............. G02F 1/3528 |

FOREIGN PATENT DOCUMENTS

| | | |
|---|---|---|
| JP | 2007193230 A | 8/2007 |
| WO | 2011146407 A2 | 11/2011 |
| WO | 2013104029 A1 | 7/2013 |
| WO | 2013178232 A1 | 12/2013 |

OTHER PUBLICATIONS

Danish Search Report dated Jun. 22, 2020 issued by the Danish Patent and Trademark Office in corresponding Patent Application No. PA 2019 70800. (9 pages).

Danish Search Report dated Jun. 12, 2020, issued by the Danish Patent and Trademark Office in corresponding Danish Patent Application No. PA 2019 70801. (9 pages).

Danish Search Report dated Jun. 15, 2020 issued by the Danish Patent and Trademark Office in corresponding Danish Patent Application No. PA 2019 70802. (10 pages).

International Search Report (PCT/ISA/210) and Written Opinion (PCT/ISA/237) dated Mar. 24, 2021, by the European Patent Office as the International Searching Authority for International Application No. PCT/DK2020/050403. (15 pages).

International Search Report (PCT/ISA/210) and Written Opinion (PCT/ISA/237) dated Mar. 26, 2021, by the European Patent Office as the International Searching Authority for International Application No. PCT/DK2020/050404. (14 pages).

International Search Report (PCT/ISA/210) and Written Opinion (PCT/ISA/237) dated Mar. 30, 2021, by the European Patent Office as the International Searching Authority for International Application No. PCT/DK2020/050402. (13 pages).

International Preliminary Report on Patentability received for PCT Patent Application No. PCT/DK2020/050402, mailed on Jun. 30, 2022, 8 pages.

International Preliminary Report on Patentability received for PCT Patent Application No. PCT/DK2020/050403, mailed on Jun. 30, 2022, 9 pages.

* cited by examiner

LIGHT SOURCE

The present invention relates to a light source, such as, for example, a light source having a broadband output and/or a light source that can operate in different modes.

A broadband light source generally refers to a light source that emits light having a broad bandwidth of wavelengths, for example, 50 nm or more. Broadband light sources can for example include incandescent or fluorescent lamps, providing a broad spectrum, typically in the range of 400 nm to 1700 nm. For such sources, however, the intensity is limited by the quality of the filament employed or the efficiency of the gas excitation. Furthermore, as the light is not spatially coherent, coupling the light into a fiber might be challenging, resulting in a low-power, low-brightness source with mediocre quality. One or more of the foregoing limitations can be less than optimal for many applications Supercontinuum generation is often able to provide improvement over one or more of the above limitations. Supercontinuum generation relates to the formation of a broad, typically continuous, spectrum through propagation of high power light, typically pulses, through a nonlinear element, such as a nonlinear fiber. The term supercontinuum does not cover a specific phenomenon but rather can include at least some of plethora of nonlinear effects, such as self-phase modulation, Raman scattering, phase matching and soliton generation, leading to considerable broadening of optical pulses. The spectrum achieved through supercontinuum generation in a nonlinear optical fiber typically covers a broader spectrum, for example in some instances with wavelength in the range of 400-2400 nm, with respect to incandescent or fluorescent lamps, and can provide one or more of higher intensity, single-mode beam characteristics, excellent pointing stability and the brightness of a laser.

Broadband light sources find applications in fields such as spectroscopy, Optical Coherence Tomography (OCT), metrology, scientific instrumentation, bio-imaging, semiconductor inspection and many more.

It is an object of the present invention to provide a light source that can be operated in different operational modes.

It is also an object of the present invention to provide a light source which circumvent power degradation of a nonlinear fiber.

The object is satisfied by a light source in accordance with the embodiments described below. The object can be satisfied by a light source as recited in the appended claim 1, where certain preferred embodiments are disclosed in the dependent claims.

In some embodiments, a light source comprises a pulse generator for providing an initial sequence of light pulses, the initial sequence of light pulses having an initial number of light pulses in a selected time period, where the pulse generator comprises an optical source for producing optical pulses and a modulator in communication with the optical source for increasing or decreasing the initial number of pulses provided by the pulse generator in the selected time period. The light source further includes first and second optical arms for propagating, respectively, first and second sequences of light pulses, each derived from the initial sequence of light pulses, wherein the first optical arm comprises a first manipulator configured to generate the first sequence of light pulses from the initial sequence of light pulses, the first sequence of light pulses having a first number of light pulses within the selected time period, wherein the first number is higher than the initial number. The second sequence of light pulses has a second number of light pulses within the selected time period, wherein the second number can be different than, but is typically less than or equal to the initial number. The light source also comprises a nonlinear optical element arranged to receive the first sequence of light pulses or the second sequence of light pulses, where the light source is configured such the nonlinear optical element selectively receives the first sequence of light pulses or the second sequence of light pulses.

The nonlinear optical element may in particular be configured to broaden the spectrum of the sequence of light pulses passing through it. Thus, the nonlinear optical element may generate a broadband or supercontinuum spectrum from the sequence of pulses.

The light source may comprise a broadband light source, such as a supercontinuum light source.

The first sequence of light pulse provides a different and typically higher number of pulses per selected time period to the nonlinear optical element than the second sequence of light pulses. Thus, when the first sequence of light pulses is provided to the nonlinear optical element, the nonlinear optical element will generate a broadband spectrum that has a higher power than the broadband spectrum generated from the second sequence of light pulses, since the number of pulses per selected time period is higher in the first sequence of light pulses. The first sequence of light pulses may be amplified prior to launching them into the nonlinear optical element. Thereby, the total power of the first sequence light pulses is increased while the peak power of each pulse is maintained below a predefined maximum level at which material degradation is minimal. This is in particular important in relation to a degradation of the nonlinear optical element. In particular, degradation can be kept at an acceptable level while broadband or supercontinuum light with a high power and/or a high spectral energy density can be provided.

Hence, the light source can be operated in a high-power mode, for example when pulses from the first optical arm are received by the nonlinear optical element, and in a low-power mode, namely when the pulses from the second optical arm are received by the nonlinear optical element. The light source therefore allows the user to select in between these two operation modes, while, for example, performing spectroscopic measurement with the light source.

The broad band light source can include an optical switch arranged to switch either the first sequence of light pulses or the second sequence of light pulses for reception by the nonlinear optical element. The switch can facilitate operating the light source in the high power or in the low power mode.

The high power mode may be interpreted as a mode when the supercontinuum light source delivers a total power of more than 5 W, such as more than 6 W, such as more than 10 W, and such as more than 20 W measured over the entire supercontinuum spectrum extending for example from 350 nm to 850 nm and optionally up to at least 1200 nm or up to at least 1300 nm. The high power mode can be a mode of the supercontinuum light source which delivers a total power of more than 0.5 W, such as more than 1 W, such as more than 2 W, such as more than 5 W, such as more than 10 W measured over the entire visible supercontinuum spectrum extending from at least 350 nm up to at least 850 nm.

The high power mode can be a mode of the supercontinuum light source which delivers a power spectral density of more than 10 mW/nm, such as more than 20 mW/nm, such as more than 25 mW/nm, such as more than 50 mW/nm measured over at least a range of 10 nm within the part of the supercontinuum spectrum extending from at least 1200 nm up to at least 1300 nm.

The high power mode of the supercontinuum light source can deliver a power spectral density of more than 1 mW/nm, such as more than 2 mW/nm, such as more than 5 mW/nm, such as more than 10 mW/nm, such as more than 20 mW/nm measured over at least a range of 10 nm within the visible supercontinuum spectrum extending from at least 350 nm up to at least 850 nm.

In one embodiment, the optical switch has an input and two outputs, and is arranged to selectively provide the initial sequence of light pulses to either the first optical arm or to the second optical arm.

Thus in this embodiment it is possible to switch between different operation modes of the light source, and in particular between a high-power operation mode by setting the switch such as to provide the initial sequence of light pulses to the first optical arm and a low-power operation mode by setting the switch such as to provide the second sequence of light pulses to the second optical arm.

In one embodiment the optical switch has two inputs and an output and is configured to receive the first sequence of light pulses and the second sequence of light pulses and to selectively provide either the first sequence of light pulses or the second sequence of light pulses to the nonlinear optical element. Thus, in dependence on the setting of the switch, a nonlinear optical element is arranged to receive the first sequence of light pulses or the second sequence of light pulses, and the light source can be selected to operate in a low-power or in a high-power mode.

Thus, the switch can be arranged subsequent to the first and second optical arms and receive the output from both arms. The light pulses received from an optical arm that are not provided to the nonlinear optical element can for example be guided to an optical dump.

The modulator can modulate the optical source, preferably in dependence of the switch setting, to allow the number of initial pulses in the selected time period provided by the pulse generator to be varied, thus allowing for increased contrast between the high power and low power modes. For example, modulator can be operated such that the initial number of light pulses within the selected time period is higher when the first sequence of pulses is delivered to the nonlinear element than when the second sequence of light pulses is delivered to the nonlinear element.

In some embodiments, the modulator can comprise an optical modulator in optical communication with, and located optically downstream of, the optical source. Such a modulator may comprise or consist of a pulse picker. The pulse picker may generate, from the initial sequence of light pulses with an initial repetition rate, the second sequence of light pulses with a repetition rate that is equal to or lower than the initial repetition rate. A pulse picker is a device that "picks" or selects some of the pulses in a sequence of pulses, thereby reducing (or keeping unaltered if all the pulses are selected) the repetition rate of the initial sequence of pulses. An acousto-optical or electro-optical modulator may be used as pulse picker.

In some embodiments, the modulator can comprise a modulator that electrically modulates the optical source, such as when the optical source comprises a laser diode for generating the initial sequence of optical pulses.

The optical source can comprise a laser diode for generating optical pulses; the light source can comprise a mode locked fiber laser for generating optical pulses.

In one embodiment the pulse generator can provide the initial sequence of light pulses to a splitter, which can comprise an optical splitter, which can be configured to provide the initial sequence of light pulses to the first and second optical arms. The intensity of the light pulses in both arms could be reduced to 50%, so that the optical splitter can be a 50/50 splitter. However, also other splitting portions are possible.

The splitter can be used in conjunction with the optical switch being arranged subsequent to the first and second optical arms described above.

In one embodiment, the switch comprises a switch having an input and an output, and one of optical arms includes such a switch inline. Where one of the optical arms includes a component that can also function as a switch, such as where the second optical arm comprises a second manipulator that can have a switching function, the other of the arms, i.e., the first arm, can comprise the switch inline. The switch and the switching function of the second manipulator can operated in opposite fashion, i.e., when one is "off" the other is "on", and vice versa.

In one embodiment, each of the optical arms comprises its own switch in line (i.e., in series with the optical path of the arm), each switch having an input and an output. The switches can be operated in opposite fashion, that is, when one is "off" the other is "on", and vice versa.

A splitter as described above can be used when one or more in line switches are used, for providing the initial sequence of light pulses to the first and second optical arms.

Thus, a switch arranged to switch either the first sequence of light pulses or the second sequence of light pulses for reception by the nonlinear optical element includes, for example, one or more two port inline switches, each of which switches just one of the optical arms, as well as a three-port switch that can choose between the optical arms.

In comparison to the generation of a broadband spectrum from the initial light pulses, the power of the broadband spectrum generated from the first sequence of light pulses can be higher, as the first sequence of light pulses includes more pulses per time period and amplification may be applied to compensate for the splitting of the initial light pulses into the first sequence pulses. The distribution of the optical power generating the broadband spectrum over more pulses (in the first sequence of pulses) provides that a high-power broadband spectrum can be generated without a substantial increase in the degradation of the nonlinear optical element.

An alternative way of increasing the power of the generated spectrum is to increase the peak power of the pulses in the initial sequence of pulses. However, high peak powers of the pulses that run through the nonlinear optical element may cause an accelerated degradation of the nonlinear optical element or may even damage the nonlinear optical element. Thus, using the first optical arm and the first manipulator allows generating light at a higher power while reducing the risk of damaging the nonlinear optical element.

For some applications, it is desirable to be able to choose between different operational modes of a light source, for example between a high-power operation mode and a low-power operation mode. In fluorescence spectroscopy applications, for example, a higher intensity spectrum is required for bleaching experiments while a low intensity spectrum is required for lifetime measurements and it is desirable to be able to switch between these two operation modes. In one aspect, the invention relates to a method for fluorescence spectroscopy utilizing an optical light source used in the high power mode, wherein the method includes a step of bleaching prior to the step of illuminating the analyzed object to record measurement data. The light source is then operated in the high-power mode during the bleaching step and operated in the low-power mode during the illumination step. This can provide the advantage that an initial rapid bleaching of e.g. fluorophore markers attached to specific molecules in a biological sample is not influencing the data recording.

The first manipulator may be configured to generate, from the initial sequence of light pulses with an initial repetition rate, a first sequence of light pulses having a repetition rate that is higher than the initial repetition rate. The first manipulator may, for example, be configured to double the repetition rate.

In some embodiments, the first manipulator comprises a pulse splitter configured to split each pulse of the initial sequence of light pulses into a given number of pulses, thereby generating a given number of sub-sequences of light pulses, the given number of sub-sequences of light pulses comprising a first sub-sequence of light pulses. The pulse splitter may be configured to delay each of the remaining sub-sequences of light pulses for a selected time period relative to the first sub-sequence of light pulses. The pulse combiner may further be configured to combine the first sub-sequence of light pulses and the further delayed sub-sequences of light pulses, thereby generating the first sequence of light pulses.

The first sequence of light pulses can for example consist of a sequence of bursts, with each burst including a plurality of pulses.

Thus, the first manipulator may be capable of multiplying the repetition rate of the initial sequence of light pulses or of creating bursts of pulses.

Pulse bursts may have an envelope. Pulse bursts may be characterized by a pulse burst repetition rate, power cycle, inter-pulse temporal spacing, and the repetition rate of individual pulses within the pulse burst.

The modulator may change/vary the initial number of pulses within the selected time period, such as by varying the repetition rate of the initial sequence of pulses, such that when the first optical arm is selected for receipt of the initial sequence of pulses and the nonlinear optical element receives the first sequence of optical pulses, the number of bursts of pulses or of the repetition rate of the pulse bursts is different than when the second arm is selected for reception and delivery to the nonlinear element. For increased contrast between high and low power modes, the number of initial pulses or initial pulse repetition rate can be higher when the first arm is selected than when the second arm is selected. The first manipulator thus increases the higher number to an even greater number of pulses, or even greater repetition rate, in the first sequence of pulses.

In some embodiments the light source can be operated such that the second sequence of light pulses comprises bursts of pulses, such as when, for example, the first manipulator is configured to produce a time spacing between individual pulses in the second sequence of pulses that is sufficiently less than the time spacing between pulses in the initial sequence of pulses.

Pulse bursts may have an envelope. Pulse bursts may be characterized by a pulse burst repetition rate, power cycle, inter-pulse temporal spacing, and the repetition rate of individual pulses within the pulse burst. The individual pulses within the pulse bursts may be referred as sub-pulses.

The splitter of the first manipulator may comprise optical fibers with different lengths for delaying the sub-sequences of light pulses. Each of the sub-sequence of light pulses may travel along a different optical fiber. Due to their different lengths, the pulses in the different sub-sequences are delayed with respect to each other.

In one embodiment, the second optical arm comprises at least one optical fiber, and preferably no manipulator, for propagating a second sequence of light pulses which corresponds to the initial sequence of light pulses. Thus, the second optical arm can provide a fiber link for providing optical communication between the pulse generator and the nonlinear optical element, so that the initial sequence of light pulses, then called the second sequence of light pulses, can be provided to the nonlinear optical element, in particular for broadband or supercontinuum generation. The second optical arm hence bypasses the first optical arm, whereby no manipulator is arranged in the second optical arm.

However, in one embodiment, the light source can comprise a second manipulator, where the second optical arm can comprise the second manipulator.

The second manipulator can be configured to generate the second sequence of light pulses such that the second sequence of light pulses comprises a different number of pulses per selected time period than the initial sequence of light pulses, typical the same number or a number that is less than the initial number.

The nonlinear optical element can be a nonlinear optical fiber, in particular a microstructured optical fiber.

A microstructured fiber comprises an array of longitudinally extending features, where one or more of the features have a refractive index that is different from material surrounding the features. The array of features acts to guide the light propagated by the fiber. The microstructured optical fiber includes a core region and a cladding region, where the cladding region typically comprises the array of features, and the features typically comprise voids. Different types of microstructured fibers can operate by different physical mechanisms; for example, in some microstructured fibers the longitudinally extending array of features provides a photonic bandgap such that light cannot exist in the cladding and is therefore confined to the core; in other microstructure fibers the longitudinally extending array of features provides an index guiding mechanism for confining light to the core, akin to total internal reflection of a conventional fiber. Microstructured fibers may rely on other mechanisms as well. Microstructure fibers may have hollow or solid cores. A photonic bandgap type microstructured fiber, for example, often has a hollow core.

The microstructured optical fiber can be for example be a photonic bandgap fiber.

The selected time period can be equal to $n*T$, wherein n is a natural number and T is the inverse of the pulse repetition rate of the pulses of the initial sequence of light pulses.

The selected time period can also be equal to $T/n$. In particular for embodiments where the first sequence of pulses comprises burst of pulses, all pulses within a burst can be contained within the predetermined time period which is a fraction of T. Namely, in this embodiment, a number of pulses is increased in the selected time period.

At least one amplifier can be arranged upstream of the nonlinear element, in particular in order to provide a desired power to the nonlinear fiber. For example, the pulse generator may comprise an amplifier, such as a fiber amplifier.

The amplifier can be configured to amplify, depending on the settings of the switch, the first or second sequence of pulses such that the peak power of the pulses in the respective sequence of pulses remains below a selected maximum level. Thereby, material degradation is mitigated, and a damage of the nonlinear optical element can be avoided.

In some embodiments, the first sequence of light pulses and the second sequence of light pulses can be generated such that the peak power of the pulses in both sequences is—at least in substance—the same.

In some embodiments, the energy or peak power of selected pulses can be controlled. For example, the peak power or energy of pulses fed into the nonlinear optical element can be controlled to a level which is below a predefined threshold level, i.e. below a predefined maximum level. The maximum level could be chosen such that a damage or a degradation of the nonlinear optical element does not occur or is reduced, such as reduced to within an acceptable level. Degradation of the nonlinear optical element is usually a continuous process. A high peak power or energy of pulses transmitted through the nonlinear optical element causes a higher degradation than pulses having a low peak power. The degradation rate can be nonlinear, so that a high peak power can cause severe damage or degradation to the nonlinear optical element. In other words, the predefined maximum level is set such that, for peak powers and energies below this level, the degradation of the nonlinear optical element is maintained at a sufficiently low magnitude to ensure a long life time of the nonlinear optical element and hence the light source. Thus, having more pulses with a peak power below a predefined maximum value per selected time period in the first sequence of light pulses can help to increase the lifetime of the nonlinear optical element and to avoid damaging the nonlinear optical element, while a high-power output can be obtained in the selected time period.

The peak power or energy of selected pulses could be controlled to be "clamped" so as to not exceed the predefined maximum level. That is, the peak power or pulse energy could vary, such as, for example, as the number of pulses per unit time varies (to a certain extent such variation is natural when pulses are amplified; without control, amplification of fewer amplified pulses per unit time can mean more energy, and hence peak power, per amplified pulse), but not allowed to vary to exceed the predefined maximum level. Also, the peak power or energy of pulses could be controlled to remain substantially the same, even as the number of pulses per unit time is varied. For example, as supercontinuum generation and the profile of the generated spectrum is responsive to the peak power, it can be advantageous to have the peak power remain the same as well as clamped below the predefined maximum level selected to reduce damage to the nonlinear optical element, where absent control or clamping the peak power or energy would be undesirably large.

As noted above, in some embodiments the peak power or energy of pulses can be controlled to remain substantially the same and/or to not to exceed the predefined maximum level. Control can be desirable where, as in the present invention, the number of pulses per unit time can vary. For example, the present invention can include one or more amplifiers. Amplifiers are typically optically pumped, such as by laser diodes, to provide for energy to transfer to the light signal to amplify the signal. Very often reducing the number of pulses amplified per unit time tend to increase the energy or peak power per pulse, as the amount of energy of optical pump power delivered over the time interval is now distributed over fewer amplified pulses.

Accordingly, one way to control the optical energy or peak power of a pulse, whether for compensating for variations due to the amplifier itself or responsive to other considerations, is to control the amplification process, such as, for example, controlling the pump laser or lasers pumping the amplifier(s). For example, the optical pump power can be reduced when fewer pulses are being amplified to compensate for the typical increase in amplified pulse energy or peak power.

A variable optical attenuator or a modulator, such as an AOM (acousto optic modulator) or and EOM (electro optic modulator) could be used, in some embodiments, to control the peak power or energy of pulses.

Control of the AOM or EOM could be in conjunction with the control of amplification.

The light source can be configured for sampling pulses, for example sampling pulses using a detector. Pulses to be delivered to the nonlinear optical element can be sampled prior to their delivery, and control can be responsive to the sampled pulse energy or peak power of pulses or of a burst of pulses (e.g., where a detector is no responsive to individual pulses). It is also possible to control the peak power or energy of the pulses responsive to a look up table, or to a formula or algorithm, or responsive to selected operation of the light source. Such control can be in conjunction with, or independent of, the aforementioned feedback control using a detector. For example, when pulses are directed to an optical arm that increases the number or repetition rate of pulses, the pulse energy or peak power of pulses can vary, at least in part, in a predictable manner. Where a pulse manipulator includes a pulse splitter, for example, the split pulses each have less energy or peak power than the pulse from which the pulses were split off. Thus, the pulse energy of peak power of pulses can be controlled, at least in part, responsive to the optical arm that is selected to propagate pulses. When pulses are split, amplification can be adjusted, such as by being increased. In some embodiments, pulse peak or energy can be controlled responsive to a setting of the switch or switches, such as by adjusting the gain of a downstream optical amplifier to increase the pulse energy or peak power when pulses are switched so as to be split in a manipulator. Similarly, pulses can be controlled responsive to the operation of a manipulator or modulator. Depending the application, any pulses of the light source can be sampled and/or controlled, such as, for example, pulses from an optical source, the initial sequence of pulses, the first or second sequence of pulses, etc. The light source can include a controller (not shown) in appropriate communication with one or more of the aforementioned elements or components for providing the desired control. The controller may be configured to control the optical switch setting and/or the amplification provided by the at least one amplifier of the light source.

A multiport optical component (also referred to as a "MOC"), as that term is used herein, means an optical component having at least one input and at least two outputs or having at least one output and at least two inputs. Switches, combiners and splitters can be examples of a multiport optical component.

In some embodiments, the light source comprises at least a first MOC, the first MOC in optical communication with the optical arms and arranged or delivering optical pulses to the optical arms or for receiving optical pulse from the optical arms. The light source can include a second MOC, wherein the first MOC is in optical communication with the pulse generator and the optical arms for delivering optical pulses to the arms, and the second MOC is in optical communication with the optical arms and with the nonlinear optical element and receives pulses from the optical arms for delivery to the nonlinear optical element. The switch can be comprised by one of the MOCs.

In some embodiments the light source generates broadband light, such as supercontinuum light.

All features disclosed in this application can also be employed in conjunction with the above-mentioned light sources.

The invention also relates to an apparatus for illuminating a material sample, in particular for material processing, comprising a light source in accordance with the present invention, and a holder for a material sample, the holder being configured to hold the material such that, in use of the light source, the material sample is illuminated with broadband or supercontinuum light emitted from the nonlinear optical element of the light source.

The invention also relates to a system for optical analysis of an object and/or a system for optical measurement of at least one parameter of an object. In some embodiments, the system for optical analysis and/or measurement comprises:
 a light source according to one of the embodiments, where the light source is arranged to illuminate the object;
 a detector for detecting light received from the illuminated objects; and
 an analyzer arranged to analyze the detected light and to derive therefrom at least one parameter of the object.

Broadband light sources, such as supercontinuum light sources, that provide a spectrally broad continuum source are useful in many systems for optical analysis and measurements, such as systems configured for optical coherence tomography (OCT), white-light interferometry, spectroscopy, optical frequency metrology, fluorescence microscopy, fluorescence lifetime measurements (FLIM), hyper-spectral imaging, flow cytometry, coherent anti-Stokes Raman scattering (CARS) microscopy and two-photon fluorescence microscopy.

In some embodiments, the system is a reflection mode measurement system arranged to measure light reflected from the analyzed object, such as a system based on white light interferometry, such as Optical Coherence Tomography (OCT). Advantageously, the system is based on time domain, frequency domain or swept source OCT.

In applications where the light interrogates sub-surface regions of the analyzed object, e.g. in OCT analysis of a patient's skin or eyes, the higher power provides that deeper parts of the object can be interrogated within the same duration or that faster analysis is provided In an embodiment, the system for optical analysis is configured for in vivo, ex vivo and/or in vitro measurements of parts of the human or animal body.

The system can be applied for different ophthalmic analysis and treatments, such as for diagnosis of Age-related macular degeneration (AMD), diabetic retinopathy or glaucoma. In some embodiments, the system is used for diagnosis in connection with treatment to correct refractive eye corrections, such as e.g. laser eye surgery to correct refractive eye conditions (LASIK). In some embodiments, the system is used for measuring the boundaries of the Bowman layer inside a human eye.

In some embodiments, the system is used for product characterization and/or sorting and/or quality inspection. The higher power of the broadband light source allows for larger interrogation volume defined from a larger interrogation area and/or depth and/or faster optical analysis of the products.

In an embodiment, the measuring system is used for analysis of semiconductor materials, e.g. nitride-containing materials, and quality inspection.

One advantage of the light source and the systems incorporating the disclosed light source is that the light source alone can provide the two operational modes (i.e. high and low-power modes). Prior art light sources would either be able to provide a high-power mode or a low-power mode, or would have significantly reduced life-time if the light source was operated simply by increasing the peak power in the pulses launched into the nonlinear optical element. The current invention may provide a versatile light source with extended lifetime.

The invention also relates to a method for optical measurement at least one parameter on an object to be measured. In some embodiments, the method for measuring comprises:
 providing a measurement system according to one of the embodiments;
 illuminating the object to be analyzed with at least part of the broadband spectrum generated by the light source of the measurement system;
 detecting light from said object by a detector; and
 analyzing the detected light to derive therefrom at least one parameter of the object.

In some embodiments, the illuminating and detection steps are executed simultaneously. This may e.g. be the case when the system is configured for OCT measurements or absorption spectroscopy where the object's optical response to the received light is instantaneous.

In some embodiments, the detection step is executed after the illuminating step. This may e.g. be the case when the system is configured for fluorescence measurements where the object's optical fluorescent response to the received light is slightly delayed.

In some embodiments, the method of analyzing comprises a bleaching step prior to the illuminating step, where the light source is operated in the high-power mode during the bleaching step and operated in the low-power mode during the illumination step. This can provide the advantage that an initial rapid bleaching of e.g. fluorophore markers attached to specific molecules in a biological sample.

The invention also relates to a spectroscopic system and/or an apparatus for carrying out spectroscopy on a sample, including a light source in accordance with the present invention for illuminating the sample with broadband or supercontinuum light and at least one detector for detecting light from the sample. The integration time of the detector preferably exceeds the time duration of a pulse and/or of a burst of pulses. The detector therefore does not "see" the structure of the pulse or burst. However, a burst as a whole is detectable. This is in particular advantageous for the detection of lower power signals. The integration time preferably does not include more than one burst. In some embodiments, the integration time can include more than one burst, that is, can be greater than the time between bursts. The integration time can exceed the time duration of a pulse but be less than the time duration of a burst of pulses.

The spectroscopic system for example can be used for analyzing dense or thick materials.

The invention is described in the following with reference to an exemplary embodiment shown in the accompanying drawings and by way of example only. The drawings show schematically:

FIG. 1: An illustration of a light source according to an embodiment.

Figure 2:
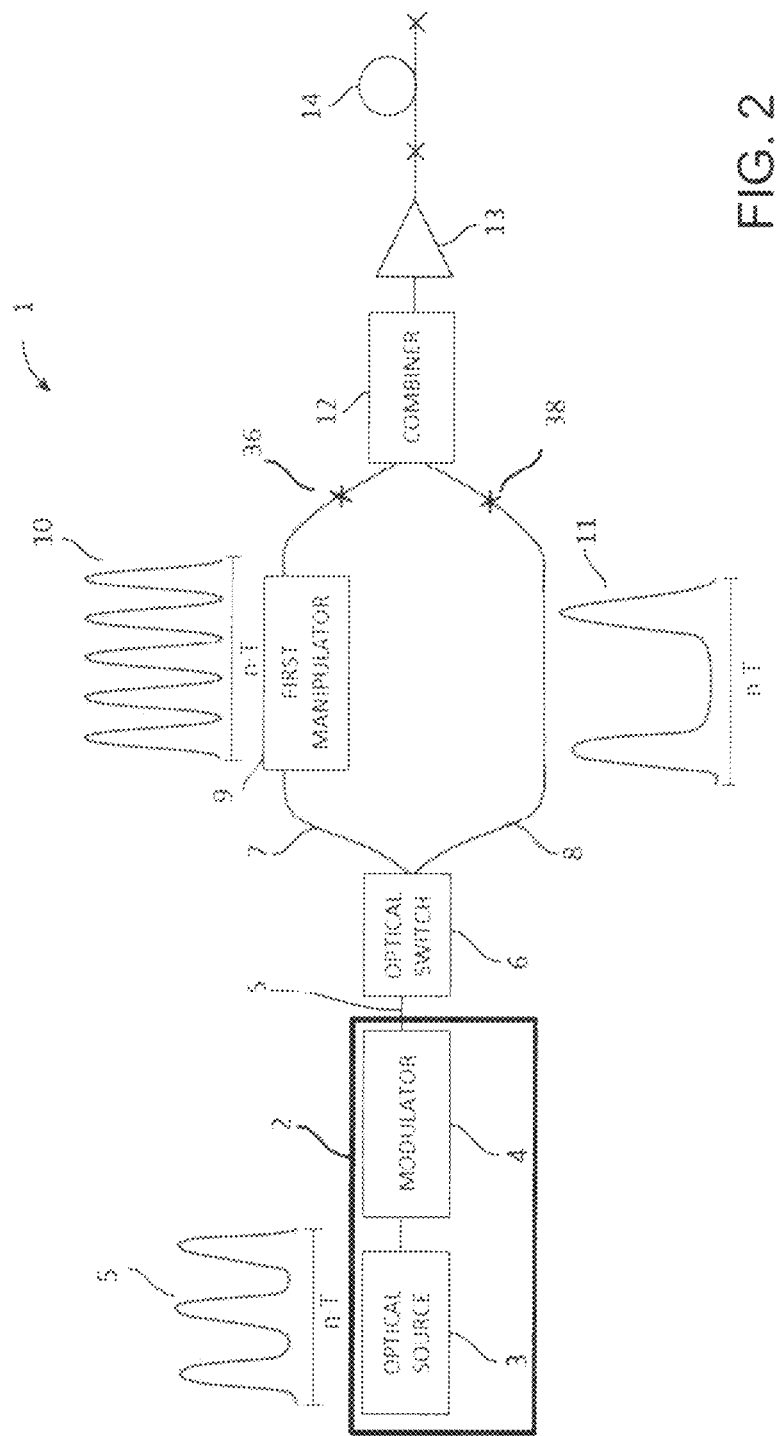

FIG. 2: An illustration of a light source according to another embodiment.

Figure 3:
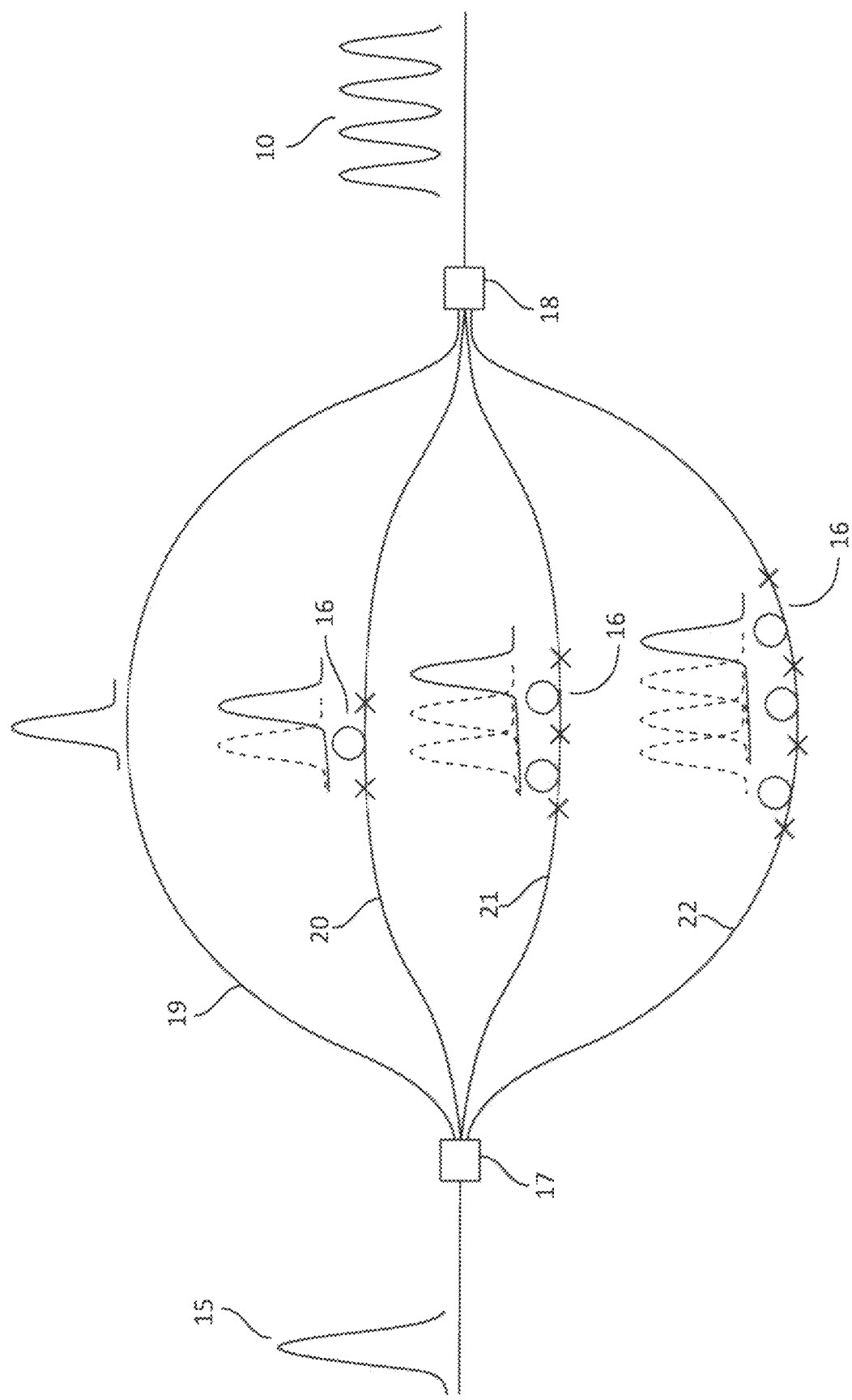

FIG. 3: An example of a manipulator that can be used in the embodiments of FIG. 1 or FIG. 2.

Figure 4:
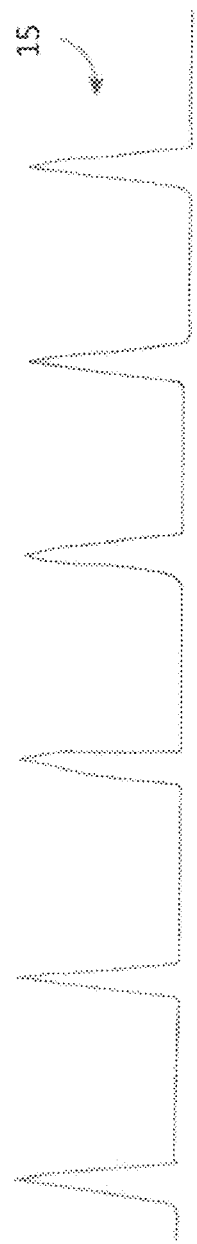
Figure 5:
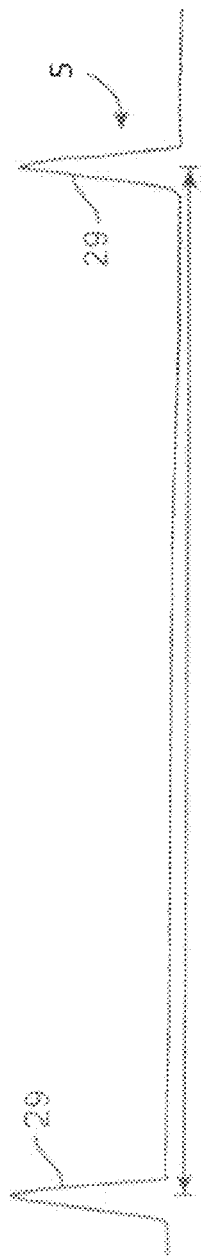
Figure 6:
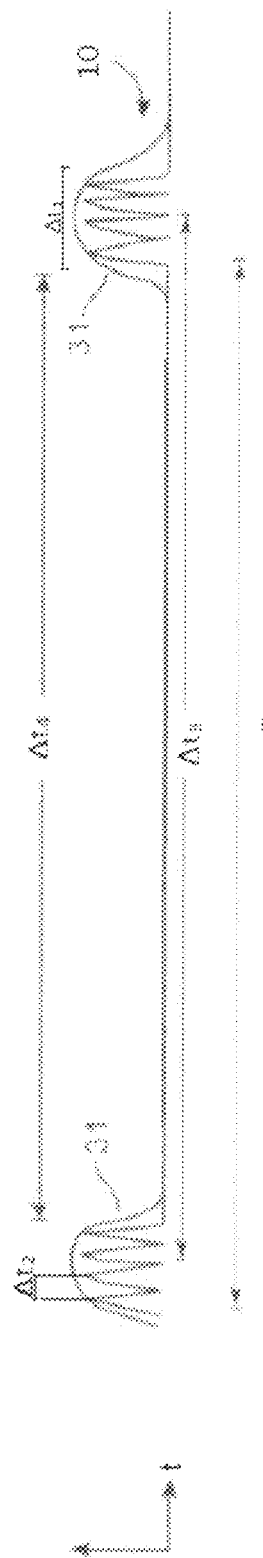

FIGS. 4 to 6: Schematically Illustrated are various sequences of light pulses that can occur according to certain practices of the light sources of FIG. 1 or FIG. 2.

FIG. 1 shows a light source 1 which can operate in at least two different power modes. A pulse generator 2, which comprises a first component, e.g. an optical source 3 and a second component, e.g. a modulator 4, generates an initial sequence of pulses 5, with a pulse width in the order of femtoseconds, picosecond or nanoseconds. The initial sequence of light pulses 5 comprises an initial number of light pulses within a selected or initial time period n·T, where n is a natural number, such as 1, 2, 3, etc. T can be the pulse period when the pulses are regular, in which case T is inversely proportional to the pulse repetition rate of the initial sequence of light pulses.

One component of the pulse generator 2 comprises an optical source and the other component comprises a modulator for varying the initial number of light pulses within the initial time period. For example, in one embodiment the first component 3 comprises modulation circuitry that electrically modulates an optical source such as a laser diode, such as a gain switched laser diode, which is comprised by the second optical component 4. In another embodiment, the second component 4 comprises an optical modulator that is located optically downstream of the optical source comprised by the first component.

An optical modulator can comprise or consist of a pulse picker. A pulse picker is a device that "picks" or selects some of the pulses in a sequence of pulses, thereby reducing (or keeping unaltered if all the pulses are selected) the repetition rate of the received pulses. A pulse picker is a standard optical device and an acousto-optical or electro-optical modulator can be used for this purpose.

The optical source can also comprise a laser generally as the first or second component, such as a mode locked laser, such as a mode locked fiber laser. The pulse generator 2 can also comprise an optical amplifier, not shown, which can act as a preamplifier, such as a fiber amplifier.

Following the pulse generator 2, a multiport optical component (MOC) 6, which in the embodiment shown in FIG. 1 comprises an optical switch, allows the initial sequence of light pulses 5 to be switched either through a first optical arm 7 or a second optical arm 8 by setting the switch 6 accordingly.

The first optical arm 7 comprises a first manipulator 9 that may, for example, comprise a delay line device. This device will be described in detail below. The manipulator 9 is capable of increasing the repetition rate over that of the initial sequence of light pulses 5 by increasing the number of pulses within the selected time period n·T with respect to the initial number of pulses. As illustrated in FIG. 3 and described in detail below, the manipulator is also able to create a first sequence of light pulses, shown schematically the first sequence 10.

The second optical arm 8 can comprise an optical fiber that does not change the number of pulses received or the repetition rate of received pulses, and so propagates a second sequence of pulses that corresponds to the initial sequence of pulses 5. Thus, the schematic illustration 11 of the second sequence of pulses 11 also schematically illustrates the initial sequence of pulses 5 when directed to the second arm 8 by the optical switch 6.

A MOC 12, which is located optically "downstream" from the "upstream" MOC 6, comprises, in the embodiment shown in FIG. 1, a combiner. The MOC/combiner 12 is in optical communication with both the output of the first optical arm 7 and the output of the second optical arm 8.

At least one optional amplifier 13 can follows the combiner 12 to amplify the signal to a desired output level. The signal from the amplifier 13 is then provided to a nonlinear optical element 14 that broadens the optical pulses and forms output pulses with a broadband spectrum. The at least one amplifier 13 can also be two amplifiers.

The nonlinear optical element 14 is, for example, a nonlinear optical fiber, in particular a nonlinear microstructured optical fiber. The nonlinear optical element can produce a supercontinuum.

The output power of the generated supercontinuum can be dependent on the pulse repetition rate, or more generally on the number of pulses per time period that are provided to the nonlinear optical element 14. Through selection of the first optical arm 7 ae user will thus select a high-power mode of the light source 1, while through selection of the second optical arm 8 the user will select a low-power mode of the light source 1.

The output power of the supercontinuum is in particular dependent on the pulse repetition rate when the peak power of the pulses used for supercontinuum generation remains in substance constant or below a certain level. The peak power or energy of selected pulse can be controlled, as discussed above. For example, the power of the initial sequence of light pulses 5 can be changed to keep the peak power of the pulses delivered to the nonlinear optical element constant. Thus, the first sequence of light pulses 10 and the second sequence of light pulses 11 have a different number of light pulses within the selected time period, but the peak power of the pulses can be the same. This can be achieved by any of the techniques noted above, such as, for example, adjusting the pump power used for generating the initial sequence of light pulses responsive to the setting of the optical switch. Alternatively, or additionally, the gain of the amplifier 13 can be controlled, such as, for example, by controlling of the optical pumping of the amplifier 13, such that the peak power of pulses is controlled as desired.

FIG. 2 schematically an embodiment of the light source of FIG. 1 where the first optical component 3 comprises an optical source, such as, for example, a laser diode or a mode locked fiber laser, and the second optical component 4 comprises an optical modulator 4 that is located optically downstream of the optical source 3. The modulator 4 can pulse pick the sequence of pulses 15 produced by the optical source 3 such that the initial sequence of pulses 5 does not include all the pulses generated by the optical source 3. The second sequence of optical pulses 11 is representative of the initial sequence of optical pulses 5, as in the embodiment shown in FIG. 2 the first optical arm 8 does not include a component that adds or removes pulses. However, it will be understood by one of ordinary skill in the art, based on the disclosure herein, that the initial sequence of pulses 5 could also be generated by a modulator that electrically modulates an optical source such that the initial sequence of pulses is generated directly by the optical source. In this instance the first optical component 3 comprises modulator circuitry and second component 4 comprises the electrically modulated optical source.

FIG. 3 shows an example of how the first manipulator 9 can be constructed. The initial sequence of light pulses 5 (only one pulse of this sequence is shown in FIG. 3) enters the first manipulator 9 and is split by a pulse splitter 17 in at least two sub-sequences of light pulses. Four sub-sequences of light pulses are shown in FIG. 3 as the pulse splitter of FIG. 3 has one input and 4 outputs. Typical ratios of the input port:output port of the pulse splitter are 1:2, 1:4, 1:8, 1:16, etc.

In the device shown in FIG. 3 four optical arms 19, 20, 21, 22 are employed. In the first arm 19 no delay is inserted. In the second arm 20 one delay line 16 is inserted. In the third arm 21 two delay lines 16 are inserted, and in the fourth arm 22 three delay lines are inserted. A combiner 18 combines the signals originating from the different optical arms 19, 20, 21, 22. The resulting signal can be a sequence of a burst of pulses 10.

By varying the number of arms of the first manipulator 9 and the delays of the optical arms 19-22, it is possible to multiply the repetition rate of the initial sequence of light pulses 5 to create pulses 10 as shown in FIG. 2, and/or to create bursts of pulses, and described below. Amplifying such a signal and launching it into the nonlinear optical element 14 will give rise to a broadband spectrum with higher output power with respect to the output power generated by selecting the other port of the optical switch, i.e. the port that leads to the second arm 8. Therefore, a high-power mode is selected when the port of the optical switch leading to the first manipulator 7 is selected.

As explained above, the four optical arms 19, 20, 21, 22 could be formed by optical fibers of the same length, with one delay line inserted in the second optical arm 20, two delay lines inserted in series into the third optical arm 21, and three delay lines inserted in series into the fourth arm 22. Alternatively, the four arms could be formed by four different optical fibers of different lengths.

In some embodiments of the invention, the light source can be configured to produce pulse bursts. With reference to FIG. 2, consider that first optical arm is selected, such that the initial pulse sequence 5 is delivered to the first optical arm 7, and the nonlinear optical element 14 receives the first sequence of light pulses. With reference to FIGS. 4-6, an example of an initial sequence of light pulses 5 as output by the pulse generator 2 is schematically shown in FIG. 5, as a plot versus time. As can be seen by comparison with FIG. 4, the modulator 4, which can be a pulse picker, has been configured such that only one in five pulses of the pulses 15 generated by the optical source 3 is provided to the first manipulator 9. The remaining pulses may be absorbed in a optical dump arranged in the modulator 4. Thus, in the described example, the first sequence of light pulses 5 has a repetition rate which is reduced by a factor of 5 with regard to the repetition rate of the pulses 15 provided by the optical source. A reduction of the repetition rate by any factor such as, for example, 2, 3 or 4, is also possible. It is also possible that the modulator/pulse picker 4 is configured to "pick" pulses from the sequence 15 of light pulses on an irregular basis, thereby generating the initial sequence 5 of light pulses which does not have a defined repetition rate.

As can be seen with regard to FIG. 5, the initial sequence 5 of light pulses comprises a first number of light pulses within a selected time period T. For example, the selected time period can be assumed to be n times the inverse of the pulse repetition rate R of the pulses of the initial sequence 5 of light pulses. As illustrated in FIG. 5, n=1, so that T=1/R. This means that there is one pulse in the time period T in the initial sequence 5 of light pulses in accordance with the example of FIG. 5. The initial sequence 5 can be amplified by an amplifier arranged prior to the first manipulator 9. Even though such sequence may have a peak power above the predefined maximum level, i.e. the damage threshold of the nonlinear optical element, this will not be the case after the first manipulator which will multiply the repetition rate of the initial sequence of light pulses. The amplification can provide that the total optical power provided to the nonlinear optical element can be increased. Thereby a high-power supercontinuum can be provided without the use of high peak power that would quickly degrade the nonlinear optical element.

The initial sequence 5 of light pulses is provided to the first manipulator 9 which is configured to generate the first sequence 10 of light pulses from the initial sequence 5 of light pulses.

FIG. 6 shows schematically an example of a first sequence 10 of light pulses that is generated from the initial sequence 5 of light pulses of FIG. 5. As can be seen in FIG. 6, the first manipulator 9 generates from a pulse 29 in the initial sequence 5 a burst 31 of pulses which consists of two or more individual pulses that have a, relatively speaking, short time delay in between them. Thus, per time period, say T, the number of light pulses in the first sequence 10 of light pulses is larger than the number of light pulses in the initial sequence 5 of light pulses. Such a burst 31 of pulses can be detected with a detector that cannot resolve the individual pulses in the burst 31. If the initial sequence 5 of light pulses has not been amplified, the amplification can occur after the bursts are generated. This can be achieved by arranging the amplifier after the first manipulator 9. These pulses can then be amplified to be below the predefined maximum level, i.e. a damage threshold of the nonlinear optical element. Thereby a high-power supercontinuum can be provided without the use of high peak power that would quickly degrade the nonlinear optical element.

A detector may then detect the burst 31 as a relatively long single pulse with high energy, in particular if it includes a plurality of closely spaced individual pulses. The integration time of the detector can therefore be longer than the duration of a burst 31, but it is smaller than the time T between consecutive bursts 31.

A measure for the duration of a burst can for example be the full-width half-maximum (FWHM) of an intensity or power signal of a burst 31. In principle, the FWHM of a burst 31 can for example correspond to the time duration between the half of the maximum power or intensity value of the pulse envelope, which corresponds to the half point of the forward flank of the first pulse and the half of the maximum power or intensity value of the rear flank of the last pulse in a burst. The burst time duration is shown as $\Delta t1$. Autocorrelation/deconvolution techniques can measure the individual pulse profiles.

With reference to FIG. 6, the time between the individual pulses of a pulse burst 31 is shown as $\Delta t2$, which is the time interval between pulse peaks of the pulses within the burst or pulses. Where the pulses within the pulse burst are regularly spaced, the inverse of $\Delta t2$, namely $1/\Delta t2$, corresponds to the repetition rate of the intra-burst individual pulses, i.e. sub-pulses.

The time duration $\Delta t3$ between pulse bursts 31 can correspond to the time spacing between peaks of the pulse burst envelope 31, which in principle is equal to the time difference between peaks of the first individual pulse of each pulse burst 31. The inverse of $\Delta t3$, $1/\Delta t3$, corresponds to the pulse burst repetition rate where the pulse bursts are regularly spaced.

FIG. 6 also shows a time duration between pulse bursts, $\Delta t4$, which can be referred to as the "interburst time spacing", and which can be taken as the time difference between the FWHMs points of opposing flanks of the bursts.

The pulse bursts 31 can be considered to have a "power cycle", which can correspond to $\Delta t1$ divided by $\Delta t3$ ($\Delta t1/\Delta t3$). The power cycle can be expressed as a percentage. The value of the power cycle is related to the number of individual pulses within each pulse burst, which is of course related to the configuration of the first manipulator 9.

In certain embodiments of the invention, the pulse burst power cycle is less than, or less than or equal to, a selected value, which selected value can be 10%, 20%, 30%, 40%, 50%, 60%, 70%, 80%, or 90%.

In certain embodiments of the invention, the pulse burst power cycle is greater than, or greater than or equal to, a selected value, which selected value can be 10%, 20%, 30%, 40%, 50%, 60%, 70%, 80%, 90%.

All sensible combinations of the foregoing are considered within the scope of the invention. For example, the power cycle can be less than or equal 80% and greater than or equal to 50%.

In certain embodiments of the invention the ratio of the number of pulses in the first sequence shown in FIG. 6 to the number of pulses in the first initial sequence shown in FIG. 5 can be greater than or equal to a selected value, with a selected value can be 2, 4, 6, 8, 10, 20, 50, 100, or 500.

In certain embodiments of the invention the ratio $\Delta t3/1\ t2$ can be greater than or equal to selected values, such as greater than or equal to 5, 10, 25, 50, 100, or 1000.

Where the pulse generator comprises a modulated optical source where the optical source is directly modulated (pulses are directly produced, not produced and then "picked"), the pulses 15 shown in FIG. 4 are not produced, and the pulse generator 2 directly produces the first sequence of optical pulses 5. In some embodiments, the spacing between sub-pulses $\Delta t_2$ may be shorter than 200 ps, such as lower than 100 ps, such as 10 ps. The spacing between the pulses $\Delta t_2$ may be larger than 1.5 times the width of the sub-pulses, such as 5 times the width of the sub-pulses, such as 10 times the width of the sub-pulses, such as 20 to 25 times width of the sub-pulses.

Again, all sensible, that is, not physically nonsensical, combinations of the foregoing embodiments describing selected values and their ranges are within the scope of the invention.

In another non-illustrated example, the first manipulator 9 may be configured to generate the first sequence 10 of light pulses such that the second first sequence 10 of light pulses has a first repetition rate which is higher than the repetition rate of the pulses 29 in the initial sequence 5. For example, the repetition rate may be two times or four times higher.

The first manipulator 9 can be configured to insert a burst of pulses 31 in between the two bursts of pulses 31 shown in FIG. 6, thereby increasing the repetition rate of the bursts of pulses from that shown in FIG. 6.

Additional Embodiments

In one embodiment of the invention, the light source can include a second manipulator (not shown in Figs.), which could be similar to the first manipulator 9 and increase the number of pulses or could be a pulse picker type manipulator that reduces pulse count. The second arm 8 could include the second manipulator, or the light source could include a third optical arm that comprises the second manipulator, in which case the MOCs 6 and 12 would have three outputs and three inputs, respectively.

In considering the embodiments herein, such as below, each can be practiced in both the alternate embodiments where the light source includes and does not include the second manipulator.

As noted above, the switch 6 and combiner 12 shown in FIGS. 1 and 2 can more generally each be considered a MOC.

In one embodiment, the upstream MOC 6 comprises a switch and the downstream MOC 12 comprises another switch. The upstream MOC switch 6 directs the initial sequence of pulses to either the first or second optical arm, and the downstream MOC switch 12 directs pulses from the first optical arm or the second optical arm to the nonlinear optical element 14. The switches are typically operated such that they both select the same optical arm.

In one embodiment the upstream MOC 6 comprises a splitter and the downstream MOC 12 comprises a switch.

In one embodiment the upstream MOC 6 comprises a switch and the downstream MOC comprises a combiner 12. This embodiment has already been discussed in more detail above.

In one embodiment, the upstream MOC 6 comprises a splitter and the downstream MOC 12 comprises a combiner.

In one variation on the foregoing, the first optical arm 7 comprises an in-line optical switch (not shown) having one input port and one output port and the second optical arm 8 also comprises a second manipulator, where the second manipulator can also function as a switch (such as when the second manipulator comprises a pulse picker). With reference to FIGS. 1 and 2, such an inline switch could be located, for example, at location 36.

In another variation of the foregoing embodiment, both of the optical arms each comprise an in-line optical switch, each of the inline optical switches having an input port and an output port, and the switches can be operated in opposite fashion, that is, when one is on the other is off and vice versa. The second manipulator may or may not be present. The inline switch in the first second optical arm 8 could be located as indicated by reference number 38.

In one embodiment, the embodiments described above do not include the nonlinear optical element, such that the first or second sequence of pulses, including when the foregoing in include pulse bursts, are output without being spectrally broadened by the nonlinear optical element.

Unless clearly indicated as otherwise, or unless clearly apparent to the person of ordinary skill that such a combination is not intended or not workable, all features discussed above in conjunction with a detailed description of FIGS. 1-6 are to be considered within the scope of the invention to be included in the additional embodiments discussed above, independently or in any combination with each other.

The term "light" herein does not only refer to visible light, but also to light in the non-visible wavelength regimes, including, for example, light in the infrared (IR) or ultra-violet (UV) wavelength regime.

The broadband spectrum generated by the nonlinear optical elements is usually a continuous spectrum, but it can also be a non-continuous spectrum.

For example, a spectrum can include very closely spaced bands of wavelengths.

LIST OF REFERENCE SIGNS

1 light source
2 pulse generator
3 first component of pulse generator
4 second component of pulse generator
5 initial sequence of optical pulses
6 multiport optical component, e.g., optical switch in FIG. 1
7 first optical arm
8 second optical arm
9 first manipulator
10 first sequence of light pulses 11 second sequence of light pulses
12 multiport optical component (e.g., optical combiner in FIG. 1)
13 amplifier
14 nonlinear optical element
15 light pulses from optical source
16 delay line
17 pulse splitter/multiport optical component
18 pulse combiner/multiport optical component
19 optical arm
20 optical arm
21 optical arm
22 optical arm
29 pulse
31 burst of pulses
36 possible location for insertion of inline switch
38 possible location for insertion of inline switch

The invention claimed is:

1. A light source, comprising:
a pulse generator for providing an initial sequence of light pulses, the initial sequence of light pulses having a selected number of light pulses in a selected time period, the pulse generator comprising
an optical source for producing optical pulses and a modulator in communication with the optical source for increasing or decreasing the selected number of pulses provided by the pulse generator in the selected time period;
first and second optical arms, for propagating, respectively, first and second sequences of light pulses, each derived from the initial sequence of light pulses;
wherein the first optical arm comprises a first manipulator configured to generate the first sequence of light pulses from the initial sequence of light pulses, the first sequence of light pulses having a first number of light pulses within the selected time period, wherein the first number is higher than the initial number;
wherein the second sequence of light pulses has a second number of light pulses within the selected time period, wherein the second number is different than or equal to the initial number;
wherein the light source further comprises a nonlinear optical element arranged to receive the first sequence of light pulses or the second sequence of light pulses; and
an optical switch arranged to switch either the first sequence of light pulses or the second sequence of light pulses for reception by the nonlinear optical element.

2. The light source of claim 1,
wherein said modulator comprises an optical modulator in optical communication with, and located optically downstream of, the optical source.

3. The light source of claim 1,
wherein said modulator electrically modulates the optical source.

4. The light source of claim 1,
wherein said optical source comprises a laser diode for generating optical pulses.

5. The light source of claim 1,
wherein said optical source comprises a mode locked fiber laser for generating optical pulses.

6. The light source of claim 1,
wherein the first manipulator is configured to generate two or more pulses with a time delay in between the two or more pulses from each pulse included in the initial sequence of light pulses.

7. The light source of claim 1,
wherein the first manipulator comprises a pulse splitter configured to split each pulse of the initial sequence of light pulses into a given number of pulses, thereby generating a given number of sub-sequences of light pulses, the given number of sub-sequences of light pulses comprising a first sub-sequence of light pulses,
wherein the pulse splitter is configured to individually delay each of the remaining sub-sequences of light pulse for a selected period of time relative to the first sub-sequence of light pulses, and
wherein a pulse combiner is configured to combine the first sub-sequence of light pulses and the further delayed sub-sequences of light pulses, thereby generating the first sequence of light pulses.

8. The light source of claim 1,
wherein the second optical arm comprises a second manipulator configured to generate a second sequence of light pulses from the initial sequence of light pulses, the second sequence of light pulses having a second number of light pulses within the selected time period, wherein the second number is different from the initial number.

9. The light source of claim 1,
wherein the second optical arm comprises at least one optical fiber for guiding the second sequence of light pulses, which second sequence corresponds to the initial sequence of light pulses.

10. The light source of claim 1,
wherein the optical switch is in optical communication with the first and second optical arms and is arranged to selectively provide the initial sequence of light pulses to either the first optical arm or the second optical arm.

11. The light source of claim 1,
wherein the optical switch is in optical communication with the first and second optical arms and is configured to receive the first sequence of light pulses and the second sequence of light pulses and to selectively provide either the first sequence of light pulses or the second sequence of light pulses to the nonlinear optical element.

12. The light source of claim 1,
wherein said optical switch has an input and an output and is arranged with one of said optical arms for switching light of only that optical arm.

13. The light source of claim 1,
wherein the nonlinear optical element comprises a nonlinear optical fiber.

14. The light source of claim 1,
wherein the nonlinear optical element comprises a microstructured optical fiber.

15. The light source of claim 1,
wherein at least one amplifier is arranged upstream of the nonlinear fiber for amplifying optical pulses.

16. The light source of claim 1,
wherein the first sequence of light pulses and the second sequence of light pulses are generated such that the peak power of the pulses in both sequences is substantially the same value or is clamped below a threshold value, where the value or the threshold value are selected for reducing optical damage to the nonlinear optical element.

17. The light source of claim 1,
wherein the light source comprises a controller configured to control the optical switch setting and/or the amplification provided by the at least one amplifier of the light source.

18. The light source of claim 1,
wherein the light source can operate in a high power mode or a low power mode depending on a setting of the switch,
where the high power mode operation is provided when the switch setting is such that the nonlinear optical element receives the first sequence of light pulses, and
where the low power mode operation is provided when the switch setting is such that the nonlinear optical element receives the second sequence of light pulses.

19. A light source comprising a nonlinear optical element for supercontinuum generation in response to light pulses propagating in the nonlinear optical element, where the light source is capable of switching between operating in a high power mode and a low power mode while mitigating accelerated degradation of the nonlinear optical element in the high power mode, the light source comprising:
a pulse generator for providing an initial sequence of light pulses, the initial sequence of light pulses having a selected number of light pulses in a selected time period, the pulse generator comprising
an optical source for producing optical pulses and
a modulator in communication with the optical source for increasing or decreasing the selected number of pulses provided by the pulse generator in the selected time period,
first and second optical arms, for propagating, respectively, first and second sequences of light pulses, each derived from the initial sequence of light pulses,
wherein the first optical arm comprises a first manipulator configured to generate the first sequence of light pulses from the initial sequence of light pulses, the first sequence of light pulses having a first number of light pulses within the selected time period, wherein the first number is higher than the initial number,
wherein the second sequence of light pulses has a second number of light pulses within the selected time period, wherein the second number is different than or equal to the initial number,
wherein the nonlinear optical element is arranged to receive the first sequence of light pulses or the second sequence of light pulses;
an optical switch arranged to switch either the first sequence of light pulses or the second sequence of light pulses for reception by the nonlinear optical element,
at least one amplifier arranged upstream of the nonlinear optical element, and
a controller in communication with the optical switch and the amplifier, wherein the controller is configured for controlling the amplification of pulses by the amplifier depending on the setting of the optical switch, such that pulses of the first sequence are amplified more than pulses of the second sequence and the total optical power provided to the nonlinear optical element within the selected time period is higher when the nonlinear optical element receives the first sequence than when receiving second the sequence, while the pulse peak power of individual pulses received by the nonlinear optical element in the high power mode can be kept below a damage threshold of the nonlinear optical element such that the high power mode is provided without accelerated degradation of the nonlinear optical element.

* * * * *